United States Patent

[11] 3,632,998

[72] Inventors Alan S. Bagley
Los Altos Hills;
Ian T. Band, Palo Alto; Charles M. Hill,
Los Altos, all of Calif.
[21] Appl. No. 693,619
[22] Filed Dec. 26, 1967
[45] Patented Jan. 4, 1972
[73] Assignee Hewlett-Packard Company
Palo Alto, Calif.

[54] ELECTRONIC COUNTER IN WHICH THE DISPLAY OF NONSIGNIFICANT DIGITS IS BLANKED
41 Claims, 9 Drawing Figs.

[52] U.S. Cl. .......... 235/92 PL, 235/92 R, 235/92 FA, 340/172.5, 340/324
[51] Int. Cl. .......... H03k 21/20, H03k 21/12
[50] Field of Search .......... 235/92, 63.5; 315/84.5; 340/324

[56] References Cited
UNITED STATES PATENTS

| | | | |
|---|---|---|---|
| 2,664,555 | 12/1953 | Thomas | 340/168 |
| 3,158,814 | 12/1964 | Brewin | 328/210 |
| 2,960,623 | 11/1960 | Adelaar | 315/84.5 |
| 3,358,125 | 12/1967 | Rinaldi | 235/92 |
| 3,395,268 | 7/1968 | Barton | 235/92 |
| 3,392,270 | 7/1968 | Bouke | 235/92 |
| 3,375,498 | 3/1968 | Scuitto | 235/92 PL |
| 3,388,384 | 6/1968 | Bogert | 235/92 PL |
| 3,449,726 | 6/1969 | Kawamoto | 235/92 PL |
| 3,460,097 | 8/1969 | Kubo | 235/92 PL |

*Primary Examiner*—Daryl W. Cook
*Assistant Examiner*—Robert F. Gnuse
*Attorney*—Roland I. Griffin

ABSTRACT: N decade counting circuits, each having a blanking state in addition to the normal zero through nine counting states, are connected in cascade to provide an N-digit electronic counter. A separate cathode indicator glow tube display circuit, such as a "Nixie" tube display circuit, is connected to each decade counting circuit to provide the electronic counter with an N-digit output display. In response to a reset signal and the position of a switch controlling the location of a decimal point in the output display, the decade counting circuits connected to display circuits on the left of the decimal point are set to the blanking state and the remaining decade counting circuits are set to the zero counting state. Each decade counting circuit set to the blanking state or to the zero counting state is set to the one counting state in response to the first input signal applied thereto and, until another reset signal is received, advances sequentially through its counting states in response to application of additional input signals. The decade counting circuits set to the blanking state are operable for switching off the cathode driving currents supplied to the "-Nixie" tubes in their associated display circuits so that all nonsignificant zeros to the left of the decimal point are blanked in the output display. Each "Nixie" tube is provided with an anode-clamping circuit to limit the rise in its anode voltage when its cathode driving current is switched off.

INVENTORS
ALAN S. BAGLEY
IAN T. BAND
CHARLES M. HILL

BY Roland D. Griffin
ATTORNEY

INVENTORS
ALAN S. BAGLEY
IAN T. BAND
CHARLES M. HILL

BY Roland D. Griffin
ATTORNEY

INVENTORS
ALAN S. BAGLEY
IAN T. BAND
CHARLES M. HILL
BY Roland D. Griffin
ATTORNEY

ELECTRONIC COUNTER IN WHICH THE DISPLAY OF NONSIGNIFICANT DIGITS IS BLANKED

BACKGROUND OF THE INVENTION

In conventional electronic counters, for example, N display circuits are typically activated by N associated decade counting circuits to provide an N-digit output display. Each display circuit displays a digit corresponding to one of the zero through nine counting states of its associated decade counting circuit. Before a count is taken, each decade counting circuit is normally reset to the zero counting state. The output display therefore appears as indicated below for a 10-digit display having three places to the right of the decimal point.

0000000.000

During and after the count, nonsignificant zeros to the left of the decimal point continue to be displayed. This is indicated below for the same 10-digit display after a count of 1000.240.

0001000.240

Display of nonsignificant zeros to the left of the decimal point serves no useful purpose. Moreover, it degrades both the readability and the appearance of the display, especially when the display comprises a large number of digits. This contributes to reading errors and increases the training time required for unskilled operators. The degradation in the readability and appearance of the above displays may be demonstrated, as indicated below, by comparing them with corresponding displays in which the nonsignificant zeros to the left of the decimal point have not been shown.

| | |
|---|---|
| 0000000.000 | .000 |
| 0001000.240 | 1000.240 |

The display circuit most commonly used in conventional electronic counters employs a cathode indicator glow tube, such as a "Nixie" tube, and a decoder driver circuit for activating the "Nixie" tube to display a digit corresponding to the counting state of a decade counting circuit associated with the display circuit. A "Nixie" tube may be inactivated to prevent the display of a nonsignificant digit by switching off its anode supply voltage. However, an integrated decoder driver circuit cannot be used to accomplish this because of the high anode voltage requirement of the "Nixie" tube. A "Nixie" tube may also be inactivated by switching off its cathode driving current. This can be accomplished with an integrated decoder driver circuit. However, when the cathode driving current is switched off the anode and cathode voltages of the "Nixie" tube are pulled up by the anode load resistor until the breakdown voltage of a transistor of the integrated decoder driver circuit is reached. The resultant breakdown current can cause spurious reactivation of the "Nixie" tube and, hence, unstable blanking.

SUMMARY OF THE INVENTION

It is the principal object of this invention to provide an electronic counter in which an output indication of nonsignificant digits, such as nonsignificant zeros to the left of the decimal point, is blanked.

Another object of this invention is to provide an electronic counter or some other such digital measuring instrument having an improved output display.

Still another object of this invention is to provide a cathode indicator glow tube display circuit, such as a "Nixie" tube display circuit, in which stable blanking is achieved while permitting the use of an integrated decoder driver circuit to inactivate the "Nixie" tube.

A further object of this invention is to provide a decade counting circuit that may be reset from any of its normal zero through nine counting states to a noncounting state in response to a reset signal and that may then be returned to its one counting state in response to the next input signal applied thereto.

These objects are accomplished according to the illustrated embodiment of this invention by employing a logic circuit, such as a decade and a gating circuit, to provide a decade counting circuit having a blanking state in addition to its normal zero through nine counting states. N of these decade counting circuits are connected to cascade to provide an N-digit electronic counter. The output display for this counter is provided by connecting each decade counting circuit to an associated display circuit comprising a digit-indicating device, such as a "Nixie" cathode indicator glow tube or a solid state multisegment display and further comprising a decoder driver circuit for activating the digit-indicating device to display a digit corresponding to the counting state of the associated decade counting circuit. Where, for example, the digit-indicating devices comprise "Nixie" tubes, each decoder driver circuit is responsive to the blanking state of the associated decade counting circuit for switching off the cathode driving current of the associated "Nixie" tube and thereby causing the "Nixie" tube to display a blank condition. A clamping circuit is connected to the anode of each "Nixie" tube to limit the rise in anode voltage when the cathode driving current of the "Nixie" tube is switched off. This permits the use of an integrated decoder driver circuit while insuring stable blanking by preventing spurious reactivation of the "Nixie" tube. In response to a reset signal and the position of a switch controlling the location of a decimal point in the output display, the decade counting circuits associated with "Nixie" tubes on the left of the decimal point are set to the blanking state and the remaining decade counting circuits are set to the zero counting state. Each decade counting circuit set to the blanking state remains in that state until it receives an input signal and registers a digit of the count. Thus, nonsignificant zeros to the left of the decimal point remain blanked throughout the count.

DESCRIPTION OF THE PREFERRED EMBODIMENT

Figure 1:
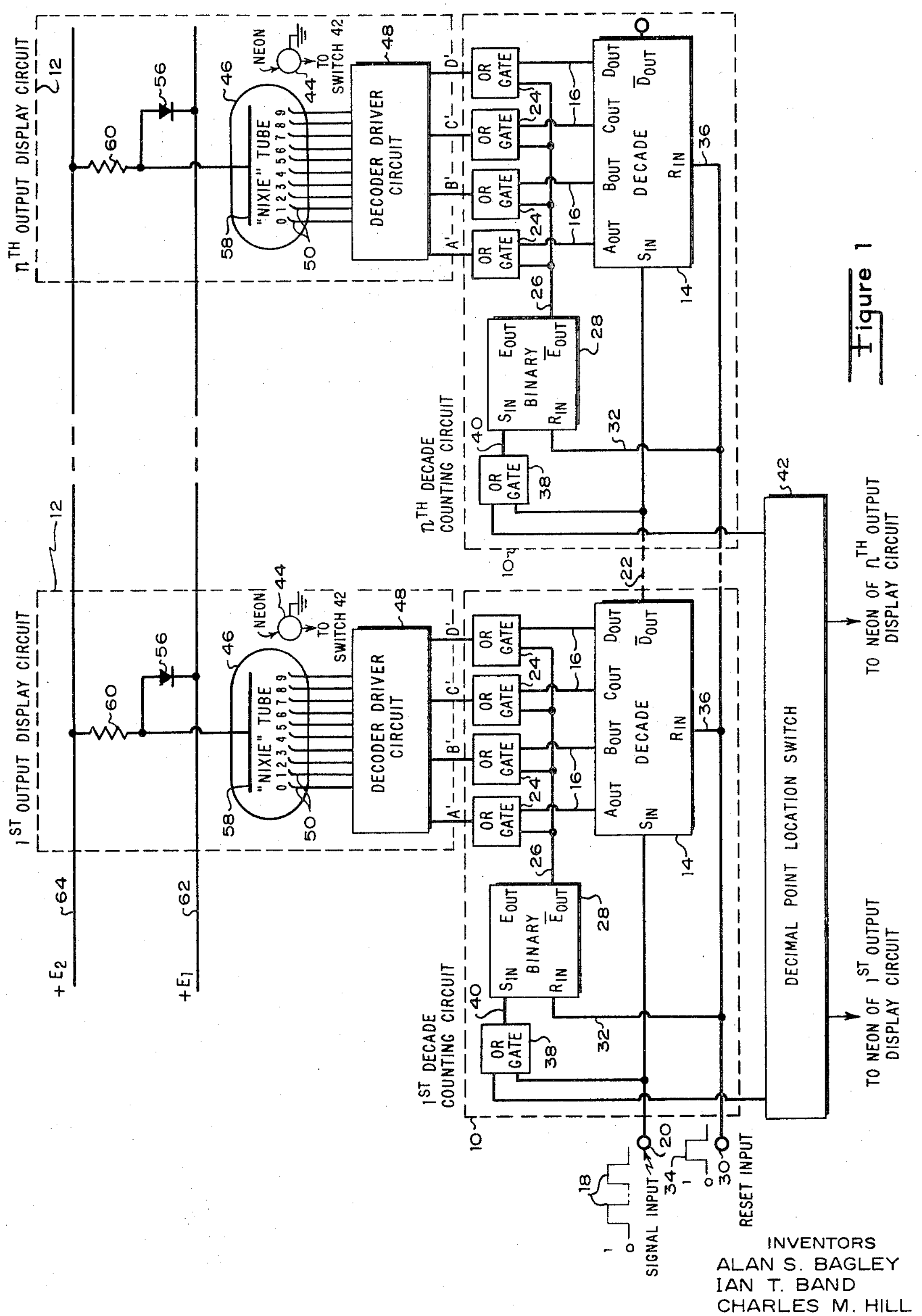
FIG. 1 is a schematic diagram of an electronic counter according to the preferred embodiment of this invention.

Referring now to FIG. 1, there is shown an electronic counter comprising N decade counting circuits 10 and N associated display circuits 12. Each decade counting circuit 10 includes a separate decade 14 for providing it with a counting loop comprising zero through nine mutually exclusive counting states. These decades 14 may comprise, for example, conventional 1·2·4·8 binary coded decades. In response to the zero-to-one logic state transitions of 10 successive input signals, such as those shown in FIG. 2(*a*), each of these decades 14 provides the 10 corresponding counting states shown in FIGS. 2(*b*)–(*e*) at its A–D outputs 16. These counting states may be defined as the 1000, 0100, . . . 1001, and 0000 counting states, where reading from left to right the first, second, third, and fourth digits of each counting state correspond to the individual logic states of the A, B, C, and D outputs 16, respectively, of the decades 14. The decades 14 are connected in cascade for counting pulses 18 applied during a selected time interval to a signal input 20 of the counter. Since each decade 14 provides a zero-to-one logic state transition signal at its $\overline{D}$ output 22 (the complement of its D output 16) in response to every tenth zero-to-one logic state transition applied to its signal input $S_{IN}$, the counting states provided at the A–D outputs 16 of all the decades 14 give an N-digit output indication of the total number of pulses 18 counted.

Each decade counting circuit 10 also includes a separate gating control circuit for providing it with a noncounting state that is excluded from the counting loop provided by the associated decade 14. This noncounting state may be employed as a blanking state to prevent or modify the output indication of a selected digit, such as a nonsignificant zero. It may comprise any one of the 0101, 1101, . . . and 1111 noncounting states of the decades 14. However, the 1111 state is preferred because it may be implemented with a minimum amount of circuitry and may be treated the same as an open circuit. Each gating control circuit may include, for example, four OR-gates 24, each having one input connected to the $\bar{E}$ output 26 (the complement of the E output) of an associated binary 28 and each having another input connected to a different one of the A–D outputs 16 of the associated decade 14. The OR-gates 24 of each gating control circuit pass the blanking state when the $\bar{E}$ output 26 of the associated binary 28 is in the one logic state, but pass the counting state of the associated decade 14 when the $\bar{E}$ output 26 of the associated binary 28 is in the zero logic state. Each state passed by the OR-gates 24 of each gating control circuit is supplied to the A′–D′ outputs of the associated decade counting circuit 10 to provide an output indication of the state of that decade counting circuit. For purposes of this specification and the claims appended thereto, the operating state of the logic means (namely, the decade 14, the OR-gates 24, and the binary 28) of each decade counting circuit 10 is considered as being defined by the logic state appearing at the A′–D′ outputs of that decade counting circuit.

Figure 3:
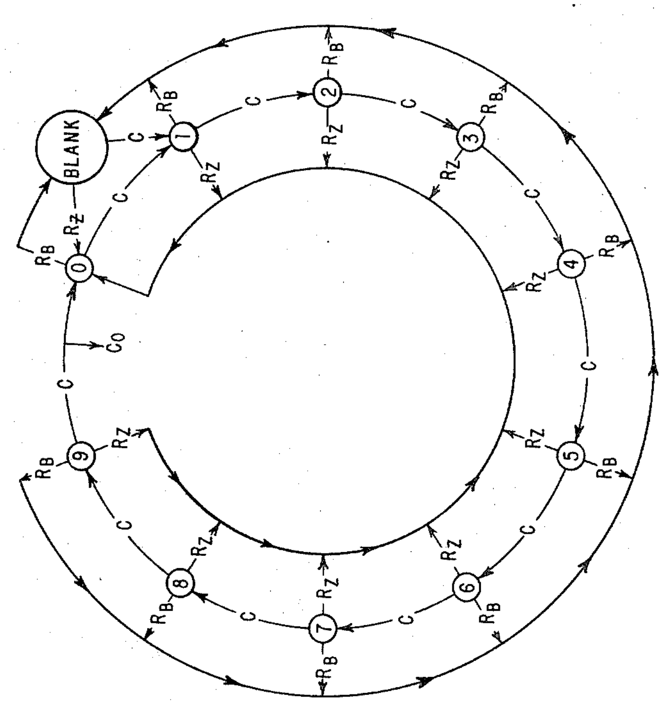
FIG. 3 is a state diagram illustrating the possible state transitions of each decade counting circuit of FIG. 1.

A reset input 30 is connected to the reset input 32 of each binary 28 so that the $\bar{E}$ output 26 of each binary 28 may be set to the one logic state in response to the zero-to-one logic state transition of a reset pulse 34 applied to the reset input 30. Thus, as indicated by the $R_B$ transitions in the state diagram of FIG. 3, each decade counting circuit 10 may be set to the blanking state from any of the zero (0000) through nine (1001) counting states by applying a reset pulse 34 to the reset input 30. The reset input 30 is also connected to the reset input 36 of each decade 14 so that each decade 14 is set to the zero counting state in response to the zero-to-one logic state transition of the same reset pulse 34 used to set the associated decade counting circuit 10 to the blanking state.

Figure 2:
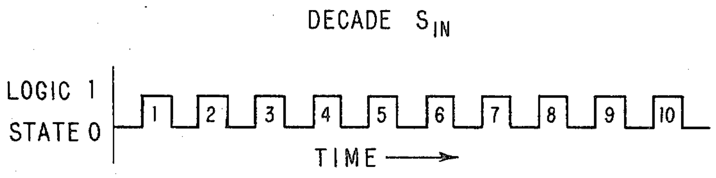
FIGS. 2(*a*)–(*f*) are waveform diagrams illustrating the operation of one of the decade counting circuits of FIG. 1.
Figure 2:
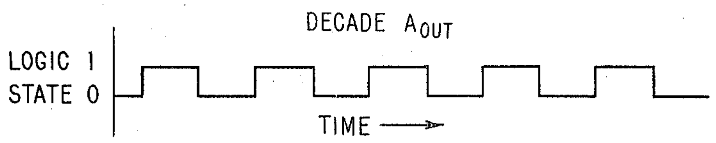
Figure 2:
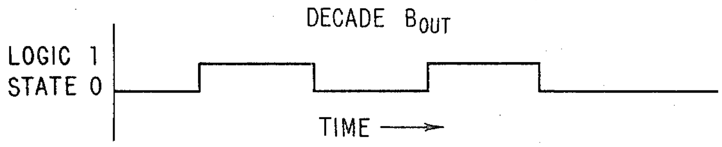
Figure 2:
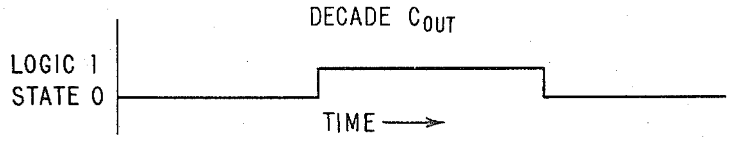
Figure 2:
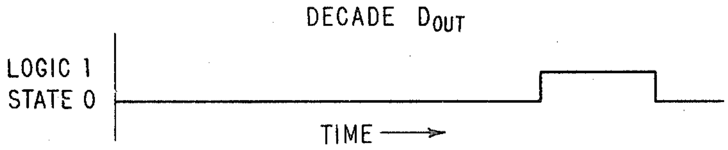
Figure 2:
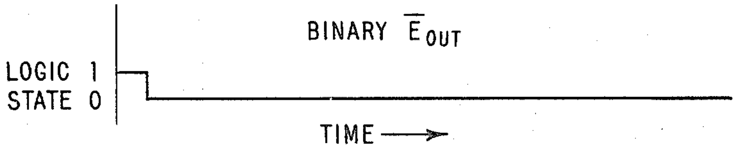

Each decade counting circuit 10 may further include an OR-gate 38 for connecting the signal input $S_{IN}$ of the associated decade 14 to the set input 40 of the associated binary 28. As shown in FIG. 2(*f*), the $\bar{E}$ output 26 of each binary 28 is therefore set to the zero logic state (assuming it is not already in that logic state) in response to the zero-to-one logic state transition of the first input signal applied to the associated decade 14. Thus, as indicated by the C transition between the blank and one states in the state diagram of FIG. 3, each decade counting circuit 10 that is initially set to the blanking state is automatically set to the one (1000) counting state in response to the first input signal applied to the signal input $S_{IN}$ of the associated decade 14. Unless a reset pulse 34 is applied to the reset input 30, each decade counting circuit 10 then switches sequentially to each of the other counting states in response to the second through the 10th input signals applied to the signal input $S_{IN}$ of the associated decade 14. This is indicated by the remaining C transitions in the state diagram of FIG. 3. The zero-to-one logic state transition signal provided at the $\bar{D}$ output of each decade 14 in response to every 10th zero-to-one logic state transition applied to the signal input $S_{IN}$ of that decade is indicated by an output signal $C_0$ during the C transition between the nine and zero counting states in the state diagram of FIG. 3.

A decimal point location switch 42 is connected for activating a neon 44 in any selected one of the N output display circuits 12 to provide a decimal point adjacent to the lower right-hand side of the selected one of the output display circuits 12. This decimal point location switch 42 is connected by each OR-gate 38 to the set input 40 of the associated binary 28. It is operative for continuously supplying a one logic state to the set input 40 of the binary 28 of each decade counting circuit 10 associated, with an output display circuit 12 on the right of the decimal point and for continuously supplying a zero logic state to the set input 40 of the binary 28 of each of the other decade counting circuits 10. The $\bar{E}$ output 26 of the binary 28 of each decade counting circuit 10 associated with an output display circuit 12 on the right of the decimal point is therefore always set to the zero logic state. Thus, each decade counting circuit 10 associated with an output display circuit 12 on the right of the decimal point is set to the zero counting state from either the blanking state or any of the one through nine counting states in response to a reset pulse 34 applied to the reset control input 30. This is indicated by the $R_Z$ transitions in the state diagram of FIG. 3. Each of the remaining decade counting circuits 10 is still set to the blanking state in response to the reset pulse 34 as described in detail above. The desired number of decade counting circuits 10 to be set to the blanking state and, hence, the number of decade counting circuits 10 to be set to the zero counting state in response to each reset pulse 34 may therefore be selected by adjusting the decimal point location switch 42.

Figure 4:
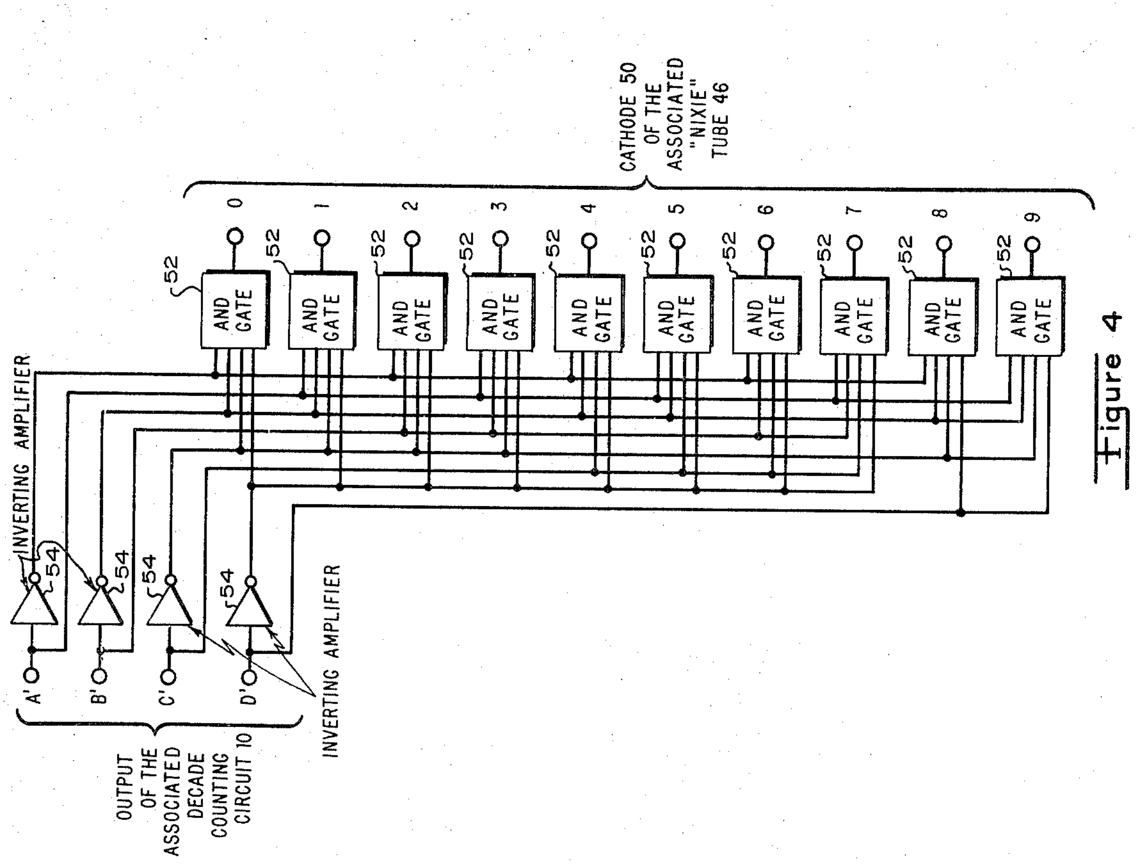
FIG. 4 is a detailed schematic diagram of one of the decoder driver blocks of FIG. 1.

Each output display circuit 12 includes a separate cathode indicator glow tube, such as a "Nixie" tube 46, and a separate decoder driver circuit 48 for connecting the A′–D′ outputs of the associated decade counting circuit 10 to the zero through nine cathodes 50 of the "Nixie" tube. As shown in FIG. 4, the decoder driver circuit 48 of each output display circuit 12 may comprise ten AND-gates 52. Each of these AND-gates 52 is connected either directly or by an inverting amplifier 54 to each of the A′–D′ outputs of the associated decade counting circuit 10 so that in state. to each counting state a current-driving signal is supplied to the appropriate cathode 50 of the associated "Nixie" tube 46 as required to activate that "Nixie" tube to display a digit corresponding to that counting state. In response to the blanking state, these AND-gates 52 prevent a current-driving signal from being supplied to a cathode 50 so that the "Nixie" tube 46 is inactivated and displays only a blank condition. The operation of each of these decoder driver circuits 48 is illustrated in the table below, where the presence of a cathode driving signal is indicated by a "1" and the absence of a cathode driving signal is indicated by a "0."

INPUT AND OUTPUT CONDITIONS OF EACH DECODER DRIVER CIRCUIT 48

| State | | Driving signal supplied to the Zero through nine cathodes 50 of the associated "Nixie" tube 46 | | | | | | | | | |
|---|---|---|---|---|---|---|---|---|---|---|---|
| | | 0 | 1 | 2 | 3 | 4 | 5 | 6 | 7 | 8 | 9 |
| 0000 | (0) | 1 | 0 | 0 | 0 | 0 | 0 | 0 | 0 | 0 | 0 |
| 1000 | (1) | 0 | 1 | 0 | 0 | 0 | 0 | 0 | 0 | 0 | 0 |
| 0100 | (2) | 0 | 0 | 1 | 0 | 0 | 0 | 0 | 0 | 0 | 0 |
| 1100 | (3) | 0 | 0 | 0 | 1 | 0 | 0 | 0 | 0 | 0 | 0 |
| 0010 | (4) | 0 | 0 | 0 | 0 | 1 | 0 | 0 | 0 | 0 | 0 |
| 1010 | (5) | 0 | 0 | 0 | 0 | 0 | 1 | 0 | 0 | 0 | 0 |
| 0110 | (6) | 0 | 0 | 0 | 0 | 0 | 0 | 1 | 0 | 0 | 0 |
| 1110 | (7) | 0 | 0 | 0 | 0 | 0 | 0 | 0 | 1 | 0 | 0 |
| 0001 | (8) | 0 | 0 | 0 | 0 | 0 | 0 | 0 | 0 | 1 | 0 |
| 1001 | (9) | 0 | 0 | 0 | 0 | 0 | 0 | 0 | 0 | 0 | 1 |
| 1111 | (BLANK) | 0 | 0 | 0 | 0 | 0 | 0 | 0 | 0 | 0 | 0 |

[1] Appearing at the A′–D′ Outputs of the Associated Decade Counting Circuit 10.

Each output display circuit 12 also includes a diode 56 for connecting a point between the anode 58 of the associated "-Nixie" tube 46 and the anode load resistor 60 to a source 62 of voltage $E_1$. The voltage $E_1$ is less than the sum of the firing voltage (about 130 volts or more) of the "Nixie" tube 46 and the breakdown voltage (about 60 volts or more) of the associated decoder driver circuit 48. Thus, when the cathode driving current of the "Nixie" tube 46 is switched off, the anode load resistor 58 cannot pull the anode and cathode of the "Nixie" tube up to the higher voltage $E_2$ of the anode voltage supply 64. This prevents the breakdown voltage of output transistors that may be employed in the associated decoder driver circuit 48 from being exceeded. An integrated decoder driver circuit 48 may therefore be used without spuriously reactivating the "Nixie" tube 46 once it has been inactivated in response to the blanking state of the associated decade counting circuit 10.

In order to maintain the output display while a new count is being taken, some form of storage is typically included between the A′–D′ outputs of each decade counting circuit 10 and the bias signal supply source 60 and 64 of the associated "Nixie" tube 46. This storage may comprise, for example, four bistable circuits connecting the A'–D' outputs of each decade counting circuit 10 to the associated decoder driver circuit 48. For purposes of this specification and the claims appended thereto, such storage circuits may be considered either as part of each decade counting circuit 10 or as part of each display circuit 12.

In the context of the above-described counter, the gating control circuitry comprising OR-gates 24 and binaries 28 has been shown and described as part of the decade counting circuits 10. However, according to still other embodiments of this invention such gating control circuitry for blanking or modifying the output display of a digit might also be included in the display circuits 12 or in means connecting decades 14, or other sources of digital data, to the output display circuits 12. Display circuits 12 wherein the individual digit indicator glow tubes 46 are excited sequentially at repetition rates faster than the eye can follow in order to create the appearance of a steady display are also well known and could be used in other embodiments of this invention.

We claim:

1. A counting circuit comprising:

a signal input for receiving signals to be counted;

a reset input for receiving a reset signal; and logic means for operating in a loop comprising $n$ mutually exclusive states and for operating in an $(n+1)$th state that is excluded from said loop, said logic means being connected to said signal input and being responsive to each input signal for changing from whichever one of said $n+1$ states it is then in to one of said $n$ states that is included in said loop, said logic means being connected to said reset input and being responsive to a reset signal for changing from any state in said loop to said $(n+1)$th state that is excluded from said loop.

2. A decade counting circuit as in claim 1 wherein:

said loop comprises ten sequential mutually exclusive counting states, each corresponding to a different one of the digits zero through nine;

said $(n+1)$th state comprises an 11th state that is excluded from said counting states;

said logic means is supplied with power during each of said 11 states;

said logic means is responsive to a reset signal for changing from whichever one of said 10 counting states it is then in to said 11th state that is excluded from said loop; and said logic means is responsive to each input signal received when it is in said 11th state that is excluded from said loop for changing from said 11th state to the one of said counting states in said loop that corresponds to the digit one.

3. A decade counting circuit as in claim 2 including switching means connecting to said logic means, said switching means being operable for selectively making said logic means responsive to a reset, signal for changing from whichever one of said 11 states it is then in to the one of said counting states in said loop that corresponds to the digit zero.

4. A decade counting circuit as in claim 3 including output display means connected to said logic means, said output display means being responsive to operation of said logic means in each counting state of said loop for providing an output indication of the one of said digits corresponding to that counting state and being responsive to operation of said logic means in said 11th state that is excluded from said loop for providing another output indication.

5. A decade counting circuit as in claim 4 wherein said other output indication is a blank condition and wherein said logic means comprises:

a decade having 10 operating states from each of which a different one of the counting states in said loop is derived, said decade having an input connected to said signal input and having an output for supplying the operating state of said decade, said decade being responsive to each input signal for changing sequentially from one of its operating states to another of its operating states;

a binary having first and second operating states, said binary having one input connected to said signal input and to said switching means, another input connected to said reset input, and an output for supplying the operating state of said binary, said binary being set to its first operating state in response to one of said switching means and an input signal applied to said signal input and being set to its second operating state in response to a reset signal applied to said reset input; and a gating circuit having one input circuit connected to the output of said decade, another input circuit connected to the output of said binary, and an output connected to said output display means, said gating circuit being responsive to the first operating state of said binary and to the operating state of said decade for supplying whichever one of the counting states in said loop is derived from that operating state of the decade to said output display means, said gating circuit also being responsive to the second operating state of said binary for supplying said 11th state that is excluded from said loop to said output display means.

6. A counting circuit as in claim 1 including means for conditioning said logic means to change from whichever one of the $n$ states in said loop it may be in to the $(n+1)$th state excluded from said loop, said logic means, when so conditioned, being responsive to a reset signal for making this change.

7. A counting circuit as in claim 1 including means for conditioning said logic means to change from whichever one of the $n+1$ states it may be in to a selected one of the $n$ states in said loop, said logic means, when so conditioned, being responsive to a reset signal for making this change.

8. A counting circuit as in claim 1 wherein:

said loop comprises 10 sequential mutually exclusive counting states, each corresponding to a different one of the digits zero through nine;

said $(n+1)$th state comprises an 11th noncounting state excluded from said loop;

said logic means is supplied with power during each of said 11 states; and said logic means is responsive to a reset signal for changing from whichever one of said 10 counting states it may be in to said 11th noncounting state.

9. A counting circuit as in claim 8 including means for conditioning said logic means to change from whichever one of said 10 counting states it may be in to one of said counting states corresponding to the digit zero, said logic means, when so conditioned, being responsive to a reset signal for making this change.

10. A counting circuit as in claim 8 including means for conditioning said logic means to change from whichever one of said 11 states it may be in to one of said counting states corresponding to the digit zero, said logic means, when so conditioned, being responsive to a reset signal for making this change.

11. A counting circuit as in claim 8 including switching means for conditioning said logic means to change from whichever one of said ten counting states it may be in to said 11th noncounting state, said logic means, when so conditioned, being responsive to a reset signal for making this change.

12. A counting circuit as in claim 11 wherein said switching means is also operable for conditioning said logic means to change from whichever one of said 11 states it may be in to one of said counting states corresponding to the digit zero, said logic means, when so conditioned, being responsive to a reset signal for making this change.

13. A counting circuit as in claim 1 wherein said logic means comprises:

counting means for operating in a loop comprising 10 sequential and mutually exclusive counting states each corresponding to a different one of the decimal digits zero through nine;

said counting means being connected to said signal input and responsive to each input signal applied thereto for sequentially changing counting states to count the number of input signals;

said counting means being connected to said reset input and responsive to a reset signal applied thereto for changing from whichever counting state it may then be in to the counting state corresponding to the decimal digit zero;

an output; and control means for connecting said counting means to said output;

said control means being connected to said signal input and to said reset input;

said control means being responsive to the counting state of said counting means and to an input signal for supplying said output with a signal indicative of the counting state of said counting means; and said control means being responsive to a reset signal for supplying said output with a signal indicative of an 11th noncounting state exclusive from the operating loop of said counting means.

14. An electronic counter comprising:

a signal input;

a reset input;

an output;

counting means for operating in a loop comprising 10 sequential and mutually exclusive states, each corresponding to a different one of the decimal digits zero through nine;

said counting means being connected to said signal input and responsive to a signal applied thereto for sequentially changing states in said loop to count the number of input signals occurring during a selected time interval;

said counting means being connected to said reset input and responsive to a reset signal applied thereto for changing from whichever state in said loop it may then be in to the state in said loop corresponding to the decimal digit zero;

control means for connecting said counting means to said output;

said control means being connected to said signal input and responsive to the state in said loop of said counting means and to an input signal applied to said signal input for supplying said output with a signal representing the state in said loop of said counting means;

said control means being connected to said reset input and responsive to a reset signal applied thereto for supplying said output with a signal representing an 11th state excluded from said loop and corresponding to a nonsignificant decimal digit;

output display means for displaying each of the decimal digits zero through nine;

said output display means being responsive to each of the signals representing one of the states in said loop for displaying the corresponding one of the decimal digits zero through nine and responsive to the signal representing the 11th state excluded from said loop for modifying the display of the corresponding nonsignificant decimal digit; and additional means for connecting said output display means to said output to provide an output display of a number derived from the number of input signals counted during the selected time interval.

15. An electronic counter as in claim 14 wherein:

said output display means includes first means for displaying a decimal point;

said counter includes second means for determining the position of said decimal point in the output display; and said control means is also responsive to the state in said loop of said counting means and to said second means for supplying said output with a signal representing the state in said loop of said counting means.

16. An electronic counter as in claim 14 wherein:

said counting means comprises N counting circuits connected in cascade to said signal input;

each of said N counting circuits being operable in a loop comprising 10 sequential and mutually exclusive states, each corresponding to a different one of the decimal digits zero through nine;

one or more of said N counting circuits being responsive to each input signal applied to said signal input for sequentially changing states to count the number of input signals occurring during the selected time interval;

each of said N counting circuits being connected to said reset input and responsive to a reset signal applied thereto for changing from whichever state it may then be in to the state corresponding to the decimal digit zero;

said output comprises N separate outputs;

said control means comprises N control circuits, each for connecting an associated different one of said N counting circuits to an associated different one of said N outputs;

each of said control circuits being connected to an input of the associated one of said N counting circuits and responsive to an input signal applied thereto and to the state of the associated one of said N counting circuits for supplying the associated one of said N outputs with a signal representing the state of the associated one of said N counting circuits;

each of said control circuits being connected to said reset input and responsive to a reset signal applied thereto for supplying the associated one of said N outputs with a signal representing an 11th state excluded from the operating loop of the associated one of said N counting circuits and corresponding to a nonsignificant decimal digit;

said output display means is responsive to each of the signals representing one of the states in the operating loops of said N counting circuits for displaying the corresponding one of the decimal digits zero through nine and is responsive to each of the signals representing the 11th state excluded from the operating loops of said N counting circuits from modifying the display of the corresponding nonsignificant decimal digit; and said additional means connects said output display means to each of said N outputs for providing an output display of one or more decimal digits representing the number derived from the number of input signals counted during the selected time interval.

17. An electronic counter as in claim 16 wherein said output display means includes N digit indicator glow tubes, each of said glow tubes having an anode and zero through nine decimal digit indicating cathodes and providing an output indication of a decimal digit corresponding to whichever one of its decimal digit-indicating cathodes is activated.

18. An electronic counter as in claim 17 wherein said output display means further includes:

N inputs, said additional means connecting each of said N inputs to an associated different one of said N outputs to receive each of the signals supplied to the associated one of said N outputs;

supply means connected to the anode of each of said glow tubes for supplying bias signal thereto;

decoder driver means for connecting each of said N inputs to the decimal digit-indicating cathodes of an associated different one of said N glow tubes;

said decoder driver means being responsive to each of the signals received at each of said N inputs and representing one of the states in the operating loops of said counting circuits for activating the corresponding one of the decimal digit-indicating cathodes of the associated one of said N glow tubes;

said decoder driver means also being responsive to each of the signals received at each of said N inputs and representing the eleventh state excluded from the operating loops of said N counting circuits for inactivating all of the decimal digit-indicating cathodes of the associated one of said N glow tubes;

a source of reference potential; and means for connecting a point between the anode of each of said N glow tubes and the supply means to said source of reference potential to limit the anode voltage of each of said N glow tubes when all of its decimal digit-indicating cathodes are inactivated.

19. An electronic counter as in claim 18 wherein:

said counter includes conditioning means for conditioning one or more of said N control circuits to supply the associated one or more of said N outputs with a signal representing the eleventh state excluded from the operating loops of said N counting circuits; and each of said N control circuits, when so conditioned, is responsive to a reset signal applied to said reset input for supplying the associated one of said N outputs with a signal representing the 11th state excluded from the operating loops of said counting circuits.

20. An electronic counter as in claim 19 wherein:

each of said N control circuits is responsive to an input signal applied to the input of the associated one of said N counting circuits for conditioning itself to supply the associated one of said N outputs with a signal representing the state of the associated one of said N counting circuits;

said conditioning means is also operable for conditioning each of said N control circuits to supply the associated one of said N outputs with a signal representing the state in the operating loop of the associated one of said N counting circuits; and each of said N control circuits, when so conditioned, is responsive to the state in the operating loop of the associated one of said N counting circuits for supplying the associated one of said N outputs with a signal representing the state in the operating loop of the associated one of said N counting circuits.

21. An electronic counter as in claim 20 wherein:

said output display means includes means for displaying a decimal point; and said conditioning means comprises switching means for determining the position of the decimal point in the output display.

22. An electronic counter as in claim 21 wherein said switching means is operable for conditioning each of said N control circuits associated with one of said N glow tubes on the left of both the decimal point and the most significant nonzero decimal digit of the output display to supply the associated one of said N outputs with a signal representing the 11th state excluded from the operating loops of said N counting circuits.

23. An electronic counter as in claim 14 wherein said output display means includes:

a digit indicator glow tube having an anode and zero through nine decimal digit-indicating cathodes, said digit indicator glow tube providing an output indication of a decimal digit corresponding to whichever one of its decimal digit-indicating cathodes is activated;

a source of supply potential connected to the anode of said digit indicator glow tube;

a source of bias potential having a value less than said supply potential; and a source of bias potential having a value less than said supply potential; and circuit means connected between said source of bias potential and a point intermediate said source of supply potential and the anode of said digit indicator glow tube for limiting the anode potential of said digit indicator glow tube when all of its decimal digit-indicating cathodes are inactivated.

24. An electronic counter as in claim 23 wherein said circuit means comprises a unidirectional conducting element for clamping the anode of said digit indicator glow tube to a potential below said supply potential when all of the decimal digit indicating cathodes of said digit indicator glow tube are inactivated.

25. An electronic counter as in claim 24 wherein said unidirectional conducting element is a diode.

26. An electronic circuit comprising:

a source of digital data signals, each representing one of the decimal digits zero through nine or a blank condition;

N inputs connected to said source to receive N digital data signals therefrom;

N digit indicator glow tubes, each having an anode and zero through nine decimal digit indicating cathodes and displaying a decimal digit corresponding to whichever one of its decimal digit indicating cathodes is activated;

supply means connected to the anode of each of said N digit indicator glow tubes for supplying a bias signal thereto;

decoder driver means for connecting each of said N inputs to the digit-indicating cathodes of an associated different one of said N digit indicator glow tubes;

said decoder driver means being responsive to each digital data signal received at each of said N inputs and representing a decimal digit for activating a corresponding one of the decimal digit indicating cathodes of the associated one of said N digit indicator glow tubes to display that decimal digit;

said decoder driver means also being responsive to each digital data signal received at each of said N inputs and representing a blank condition for inactivating all of the decimal digit indicating cathodes of the associated one of said N digit indicator glow tubes to display a blank;

a source of reference potential; and means for connecting a point between the anode of each of said N digit indicator glow tubes and the supply means to said source of reference potential to limit the anode voltage of each of said N digit indicator glow tubes when all of its decimal digit indicating cathodes are inactivated.

27. An electronic circuit as in claim 26 wherein said source of digital data comprises N decade counting circuits, each of said decade counting circuits comprising:

a decade having ten sequential and mutually exclusive operating states from each of which a digital data signal representing a different one of the decimal digits zero through nine is derived, said decade having an input for receiving input signals to be counted and an output for supplying the operating state of said decade;

said decade being responsive to each input signal applied to its input for changing sequentially from one of its operating states to another of its operating states;

a switch for determining the position of a decimal point relative to the decimal digits displayed by said N digit indicator glow tubes;

a reset input for receiving a reset signal;

a binary having first and second operating states, said binary having one input connected to the input of said decade and to said switch, another input connected to said reset input, and an output for supplying the operating state of said binary;

said binary being set to its first operating state in response to one of said switch and an input signal applied to the input of said decade and being set to its second operating state in response to a reset signal applied to said reset input; and a gating circuit having one input circuit connected to the output of said decade, another input circuit connected to the output of said binary, and an output connected to an associated one of said N inputs;

said gating circuit being responsive to the first operating state of said binary and to the operating state of said decade for supplying a digital data signal representing a decimal digit and being derived from that operating state of the decade to the associated one of said N inputs, said gating circuit also being responsive to the second operating state of said binary for supplying a digital data signal representing a blank condition to the associated one of said N inputs.

28. An electronic counter as in claim 27 wherein:

each of said binaries is associated with a different one of said N digit indicator glow tubes; and said switch is operable for setting each of said binaries associated with one of said N digit indicator glow tubes on the right of the decimal point to its first operating state 29. An electronic circuit as in claim 26 wherein:
said bias signal comprises a supply potential; and
said reference potential has a value below that of said supply potential.

30. An electronic circuit comprising:
N sources of digital data signals, each representing one of the decimal digits zero through nine;
each of said N sources having a signal input and being responsive to input signals applied thereto for providing the digital data signals;
N outputs;
N control means, each connecting an associated different one of said N sources to an associated different one of said N outputs and being responsive to application of an input signal to the signal input of the associated one of said N sources for supplying the associated one of said N outputs with a digital data signal from the associated one of said N sources;
each of said N control means also being responsive to a control signal for supplying the associated one of said N outputs with a digital data signal representing a blank condition; and
output display means responsive to each of the digital data signals representing one of the decimal digits zero through nine for displaying that decimal digit and responsive to each of the digital data signals representing a blank condition for displaying a blank;
said output display means being connected to each of said N outputs for providing an output display of one or more decimal digits representing the digital data signals supplied to said N outputs from said N sources.

31. An electronic circuit as in claim 30 wherein:
said circuit includes conditioning means for conditioning one or more of said N control means to supply the associated one of said N outputs with a digital data signal representing the blank condition; and
each of said N control means, when so conditioned, is responsive to a control signal for supplying the associated one of said N outputs with a signal representing the blank condition.

32. An electronic circuit as in claim 31 wherein:
each of said N control means is responsive to application of an input signal to the signal input of the associated one of said N sources for conditioning itself to supply the associated one of said N outputs with a digital data signal from the associated one of said N sources;
said conditioning means is also operable for conditioning each of said N control means to supply the associated one of said N outputs with a digital data signal from the associated one of said N sources;
said control means, when so conditioned, is responsive to a digital data signal from the associated one of said N sources for supplying the associated one of said N outputs with that digital data signal.

33. An electronic circuit as in claim 32 wherein:
said output display means includes means for displaying a decimal point; and
said conditioning means comprises switching means for determining the position of the decimal point in the output display.

34. An electronic circuit as in claim 33 wherein:
said output display means comprises N digit-indicating devices each responsive to a digital data signal representing one of the decimal digits zero through nine for displaying that decimal digit and responsive to a digital data signal representing a blank condition for displaying a blank; and
each of said N control means is associated with a different one of said N digit-indicating devices;
said switching means is operable for conditioning each of said N control means associated with one of said N digit-indicating devices on the left of both the decimal point and the most significant nonzero digit of the output display to supply the associated one of said N outputs with a digital data signal representing the blank condition.

35. An electronic circuit as in claim 30 wherein said output display means comprises:
N digit indicator glow tubes, each having an anode and zero through nine decimal digit-indicating cathodes and displaying a decimal digit corresponding to whichever one of its decimal digit-indicating cathodes is activated;
a source of supply potential is connected to the anode of each of said digit indicator glow tubes;
a source of bias potential is provided, said bias potential having a value less than said supply potential; and
circuit means is connected between said source of bias potential and a point intermediate said source of supply potential and the anode of each of said digit indicator glow tubes for limiting the anode potential of each of said digit indicator glow tubes when all of its decimal digit-indicating cathodes are inactivated.

36. An electronic circuit as in claim 35 wherein said circuit means comprises a separate unidirectional conducting element for clamping the anode of each of said digit indicator glow tubes to a potential below said supply potential when all of its decimal digit-indicating cathodes are inactivated.

37. An electronic circuit as in claim 36 wherein said unidirectional conducting elements are diodes.

38. A multiple digit output display comprising:
a plurality of inputs for receiving a plurality of logic states, each of said logic states representing a significant digit or a nonsignificant digit;
a plurality of digit indicator glow tubes, each of said glow tubes having an anode and zero through nine digit-indicating cathodes, each of said glow tubes being operable for displaying any one of the digits zero through nine in response to activation of the corresponding one of its cathodes;
supply means connected to the anode of each of said glow tubes for supplying bias signal thereto;
decoder driver means for connecting each of said inputs to the digit-indicating cathodes of an associated one of said glow tubes, said decoder driver means being responsive to each logic state received at each of said inputs and representing a significant digit for activating a corresponding one of the digit-indicating cathodes of the associated one of said glow tubes and being responsive to each logic state received at each of said inputs and representing a nonsignificant digit for inactivating all of the digit-indicating cathodes of the associated one of said glow tubes;
a source of reference potential; and
means for connecting a point between the anode of each of said glow tubes and the supply means to said source of reference potential to limit the anode voltage of each of said glow tubes when all of its cathodes are inactivated.

39. A multiple digit output display as in claim 30 wherein said last-mentioned means comprises a plurality of unidirectional conducting elements, each of said unidirectional conducting elements being connected between said source of reference potential and a point intermediate said supply means and the anode of an associated different one of said glow tubes and being poled for clamping the anode of the associated one of said glow tubes to a signal level below that of said bias signal when all of its digit-indicating cathodes are inactivated.

40. A multiple digit output display as in claim 39 wherein said unidirectional conducting elements are diodes.

41. An electronic circuit as in claim 30 wherein:
each of said N sources also has a control input; and
each of said N control means is responsive to application of a control signal to the control input of the associated one of said N sources for supplying the associated one of said N outputs with a digital data signal representing a blank condition.

* * * * *

UNITED STATES PATENT OFFICE
CERTIFICATE OF CORRECTION

Patent No. 3,632,998 Dated January 4, 1972

Inventor(s) Alan S. Bagley, Ian T. Band and Charles M. Hill

It is certified that error appears in the above-identified patent and that said Letters Patent are hereby corrected as shown below:

Column 2, line 4, "connected to" should read -- connected in --;

Column 4, line 26, "in state. to" should read -- in response to --;

Column 7, line 50, after "digit" and before " ; " insert -- and for doing so independently of the state of other such counting means --;

Column 8, line 38, "circuits from modifying" should read -- circuits for modifying --;

Column 11, line 22, after "being" insert -- independently --; line 23, after "signal" and before "for" insert -- applied thereto --.

Signed and sealed this 11th day of July 1972.

(SEAL)
Attest:

EDWARD M.FLETCHER,JR.
Attesting Officer

ROBERT GOTTSCHALK
Commissioner of Patents

FORM PO-1050 (10-69)
0-160010

USCOMM-DC 60376-P69
★ U.S. GOVERNMENT PRINTING OFFICE : 1969 O—366-334